United States Patent [19]
Harwig

[11] Patent Number: 5,083,394
[45] Date of Patent: Jan. 28, 1992

[54] ANGLING DEVICES

[76] Inventor: Jim L. Harwig, Rte. 1, Box 102, Dewey, Okla. 74029

[21] Appl. No.: 535,668

[22] Filed: Jun. 11, 1990

[51] Int. Cl.$^5$ ............................................. A01K 97/00
[52] U.S. Cl. .................... 43/43.16; 43/43.15; 43/44.83
[58] Field of Search .............. 43/43.15, 43.16, 43.1, 43/44.83

[56] References Cited

U.S. PATENT DOCUMENTS

| | | | |
|---|---|---|---|
| 2,333,503 | 11/1943 | Worden | 43/44.83 |
| 2,823,486 | 2/1958 | Behee | 43/43.16 |
| 3,130,514 | 4/1964 | Cormick | 43/43.16 |
| 3,490,166 | 1/1970 | Whisenhunt | 43/43.15 |
| 3,841,013 | 10/1974 | Sabagonis | 43/43.15 |
| 4,581,839 | 4/1986 | Mattison | 43/43.16 |

FOREIGN PATENT DOCUMENTS 668002 10/1929 France ........................... 43/43.15

Primary Examiner—Kurt Rowan
Attorney, Agent, or Firm—Edward L. Bowman

[57] ABSTRACT

Angling devices are disclosed having improved resistance to becoming hung up on brush and the like. Included is a hook having an elongated shank portion, a generally U-shaped portion extending outwardly from a lower portion of said shank portion, and first and second spaced apart eyelets conencted to said hook. Rigs making use of such hooks are also disclosed. In addition an angling device is disclosed which includes (1) a relatively inflexible rod having a length of at least about 1 foot and (2) a hook and an eyelet, wherein the eyelet of said hook is attached a lower end portion of said rod in close proximity thereto.

17 Claims, 1 Drawing Sheet

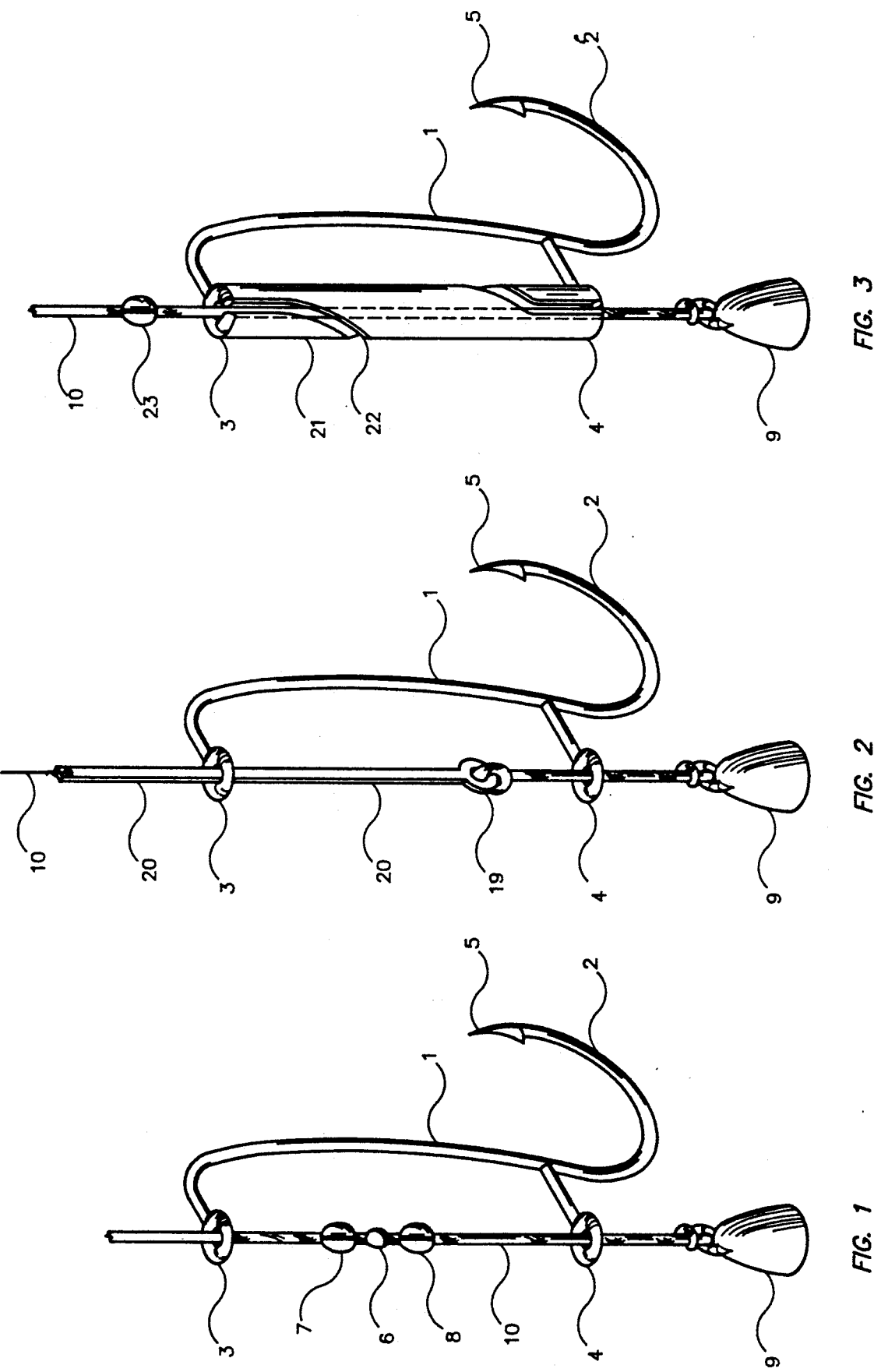

ANGLING DEVICES

FIELD OF THE INVENTION

The present invention relates to angling devices, i.e. devices useful for catching fish or other aquatic creatures. In another aspect the present invention relates to fish hooks. In still another aspect the present invention relates to fish hook rigs which are less susceptible to being hung up on brush or the like and which are more easily unhooked when hung up. This invention further relates to this inventor's Information Disclosure Document No. 249512 dated Mar. 26, 1990, the disclosure of which is incorporated herein by reference.

BACKGROUND OF THE INVENTION

During the history of mankind a wide variety of devices have been developed to aid man in his ability to catch fish and other aquatic creatures. One of the simplest, and yet most important developments was the fish hook. A great variety of fish hooks have been developed for a variety of different reasons.

One of the problems found with most any fish hook is the tendency of the hook to become hung up on stumps, brush, and the like. When an angler finds his hook hug up on such an undesirable object it is generally necessary to break the line or at least move to a position over the hook so that it can possibly be unhooked from the undesired object.

Hanging up in brush or the like has been a particular problem for anglers using live bait such as minnows, shad, or the like. The most common methods of using such live bait have involved either securing a hook to the end of a line and placing a sinker at some point on the line a distance removed from the hook or securing a sinker to the end of the line and then securing the hook to the main line at some point above the sinker, generally by a length of leader line or by the use of a snelled hook. Both these methods give the live bait a degree of freedom which allows it to move in a manner that will attract other aquatic creatures. The degree of freedom of the live bait presents at least one drawback. It tends to make it possible for the bait to cause the hook to become attached to brush or the like. Such can occur when the bait is being lowered to the desired depth, when the bait is swimming at the selected depth, or when the angler decides to raise the bait so that it can be tried in another spot.

The hanging up of hooks in brush and the like interferes with much of the enjoyment of angling. It reduces the time in which one has for productive fishing. It contributes to line loss and bait loss. Further, if one is stranded or lost in a remote situation, the loss of one too many hooks could mean the total loss of one of the most productive ways that such a person has for providing the food that might be needed until that person was rescued.

An object of the present invention is to provide angling devices that have a reduced tendency to become hung up on stumps, logs, brush, and the like.

Another object of the present invention is to provide angling devices which are constructed such that if they do become hung on a log or the like, they can often be easily unhooked.

Still another object of the present invention is to provide superior angling devices for use in survival equipment.

Yet another object of the present invention is to provide a hook which can be free to rotate about the axis of the main line, a hook that does not need to be actually tied to the line.

Other aspects, objects and advantages of the present invention will become apparent from the following disclosure taken in conjunction with the accompanying Drawings.

SUMMARY OF THE INVENTION

In accordance with one embodiment of the present invention there is provided a first type of angling device comprising a hook comprising an elongated shank portion, a generally U-shaped portion extending outwardly from a lower portion of said shank portion, and first and second spaced apart eyelets connected to the hook.

In accordance with another embodiment of the present invention there is provided a second type of angling device comprising (1) a relatively inflexible rod having a length of at least about 1 foot and (2) a hook including an elongated shank portion, a generally U-shaped portion extending outwardly from a lower portion of said elongated shank portion, and an eyelet, wherein the eyelet of said hook is attached a lower end portion of said rod in close proximity thereto.

BRIEF DESCRIPTION OF THE DRAWINGS

FIG. 1 is a perspective view of one embodiment of the first type of inventive device.

FIG. 2 is a perspective view of an embodiment of the second type of inventive device employing a hook of the first type inventive device.

FIG. 3 is a perspective vies of another embodiment employing the first type of inventive device.

DETAILED DESCRIPTION OF THE INVENTION

The first type of inventive fishing device comprises a special type of hook. One example of such a hook is illustrated in FIG. 1. The hook of FIG. 1 includes an elongated shank portion 1. A generally U-shaped portion 2 extends outwardly from a lower portion of the shank portion 1. A first eyelet 3 extends outwardly from an upper portion of the shank portion 1. A second eyelet 4 extends outwardly from a lower portion of the shank portion 1. The free end of the U-shaped portion 2 ends in a pointed barb 5.

A number of variations of the inventive hook are possible. While it is currently preferred for one eylet to be positioned generally directly above the other and generally on a side of the shank 1 that is opposite the side from which the U-shaped portion extends, other arrangements are within the scope of the present invention. Thus the two eylets could extend outwardly from the same side of the shank 1 as does the U-shaped portion. It is also possible to have the eyelets extending outwardly in different directions from each other or in some direction between that and that illustrated in FIG. 1.

The term "eyelet" as used herein refers to any suitable means capable of retaining a line which extends through it. Many variations are possible. One of the eyelets could be provided by a short coil of wire secured to the shank of the hook and the other eyelet could be a solid ring of the type illustrated in FIG. 1. Another variation would be for the two spaced apart eyelets to be the opposite ends of a hollow tube as illustrated in the hook of FIG. 3, which will be described in more detail below. Still another variation would be for the spaced apart eyelets to be the opposite ends of a length of coil spring similar to the springs commonly seen in retractable ball point pens. Still another variation would involve using eyelets comprising a ring having a moveable clip which exposes a slot which extends through the ring. An example of such a device would be the type of ring devices commonly used to allow the ends of necklaces or fine chains to be readily attached. When two such moveable clip type rings are used as the two eyelets it becomes then possible to actually secure the inventive hook to a line without having to thread the line downwardly through the openings of the eyelets. Thus one can readily attach the hook to a line that already contains the terminal sinker such as sinker 9 of FIG. 1. Thus the invention provides several ways for attaching a hook to a line without the need to tie the hook to the line.

The eyelets can extend above or below the shank portion of the hook but preferable the upper eyelet extends outwardly from a upper portion of the shank of the hook and the lower eyelet extends outwardly from a lower portion of the shank of the hook, generally as illustrated in FIG. 1. Generally, it is preferred for the two spaced apart eyelets to be generally parallel to each other and generally perpendicular to the main axis of the shank of the hook. Most preferably, the two eyelets are spaced apart by a distance at least equal to the length of the generally linear portion of the shank of the hook. Generally, the eyelets would be spaced apart by a distance in the range of about ⅛ inch to about 2 inches. Of course this can vary depending upon the size of the hook. The preferred minimum distance between the two spaced apart eyelets would be about ⅛ inch to about ¼ inch. In addition the eyelets are preferably spaced apart from the shank of the hook a sufficient distance to allow the stop means to function effectively. Generally, therefor it is preferred for the center of the opening of the eyelets to be spaced apart from the shank of the hook by at least about 1/32nd of an inch, with distances in the range of about 1/32nd to about ¼ inch not being uncommon.

The inventive hook can be made using any suitable procedure. For example, a hook of the type illustrated in FIG. 1 can be made from a single length of wire by bending the wire in a suitable manner to create the upper eyelet, the shank, the lower eyelet, and then the U-shaped portion. The inventive hooks can also be made by welding, brazing, or soldering a lower eyelet on a normal hook which has an eyelet attached to an upper portion of the shank of the hook. Another way of securing one or both of the eyelets to the hook would involve molding the eyelets and the shank of the hook together using lead. The lead could encompass both eyelets and the adjoining portion of the shank or it could be just associated with one of the eyelets, for example the lower one.

It is also within the scope of the present invention to have more than two eyelets which extend outwardly from the shank portion of the hook.

The invention is applicable to a wide range of hooks, including treble hooks, hollow point double live bait hooks, Messler hooks, weedless hooks, circle sea hooks, wide gap hooks, weedless hooks, and the like, even including bent shank hooks. An especially preferred embodiment would employ a weedless hook, i.e. a hook having having a lightweight flexible wire extending from an upper portion of the shank of the hook to the pointed free end of the U-shaped portion of the hook. As is known in the art, the lightweight flexible wire helps to prevent the point of the hook from being caught on weeds, brush, or the like, while at the same time being flexible enough so that when a fish strikes the flexible wire will move so that the fish can be hooked.

A hook of the type illustrated in FIG. 1 can be used in a variety of ways. The currently preferred way to use such a hook is also illustrated in FIG. 1. A length of line 10 is passed through the eyelets 3 and 4. A stop means is provided to limit the extent to which the hook can travel along the line. In the embodiment illustrated in FIG. 1, the stop means includes a couple of weights, i.e. 7 and 8, that are free to slide on the line 10. The weights are of such size that they cannot pass through the eyelets 3 and 4. Between the weights 7 and 8 there is provided a knot or bead stop 6. The knot, bead stop, or the like is of such size that the weights 7 and 8 cannot pass over the the stop 6. The lower end of the line has a weight 9 secured thereto.

This particular arrangement provides an angling rig having a number of unusual benefits. First, since the hook is not actually tied to the line it is free to rotate around the line. Thus a live bait is still free to move in a manner that will attract the attention of aquatic creatures. However, due to the way in which the hook is attached it is less likely that the hook will become draped over a branch of submerged brush as the bait is lowered into the water. The combination of the weights 7, 8, and 9 tends to keep the hook in a generally vertical plane as the bait is lowered or raised. It also tends to keep the hook in a generally vertical plane as the bait is maintained at the desired depth. Accordingly, it is more difficult for the live bait to carry the hook into brush where it is likely to become hooked.

If a rigging of the type illustrated in FIG. 1 should happen to become hung on a branch or the like, the weights 7, 8, and 9 have the additional benefit of providing a means to assist in dislodging the hook from the branch. By mearly allowing the line to go slack the weights 7 and 8 will travel downward and exert force on the lower eyelet 4. This force is often enough to dislodge the point of the hook from the obstruction. If the lower weight or sinker 9 is secured far enough away from the lower eyelet 4, lifting the line can also in some cases result in force which can assist in dislodging the barb from an obstruction. The eyelets are preferably spaced apart from each other a sufficient distance to allow the weights 7 and 8 to have some freedom to move. By lightly jiggling the line, the lower weight 9 will swing and often dislodge the point of the hook from the obstruction.

The weights 7 and 8 could also be replaced by suitable slideable colored beads, small spinners, or the like. In addition feathers, filament skirts, or strip type baits, and the like could be attached to the weights 7 and 8 or to the stop knot or bead 6. It is also within the scope of the present invention to rig the inventive hook with only a single weight or bead secured to the line between the two eyelets. A preferred embodiment involves eliminating weight 7 and using only weight 8 between the eyelets. Weight 8 then is free to slide on the line and the stop knot 6 is free to pass through the upper eyelet but not through the slideable weight 8. This arrangement allows for the hook to be near the end of the line for casting and yet allows the hook to be spaced a long distance from the bottom after the line has been cast. This arrangement also gives the bait the ability to move the hook up and down the line between the skinker 9 and the stop knot.

The inventive hook can be used in combination with jigs, plugs, flys, etc. A preferred use involves the use of a hook rigging of the general type shown in FIG. 1 which has a spinner or blade attached to the line above the hook. Such a combination can be used for trolling using live bait, pork rind, or just the bare hook, thus providing a hook that can be useful for both still fishing with live bait or for casting or trolling.

Still another way of rigging the inventive type of hook involves passing the line through the eyelets as illustrated in FIG. 1 but substituting for the stop means comprised of 6,7, and 8, a single weight, bead, or the like which is secured in a fixed relationship to the line at a point above the uppermost eyelet. In such a rig the single weight, bead, or the like will serve as a stop to limit the extent to which the hook is free to move up the line and the lower weight 9 serves to prevent the hook from being pulled off the line.

Still yet another way of rigging the inventive type of hook involves employing a first stop means which is either secured to the line as shown in FIG. 1 or secured above the upper eyelet as described in the preceding paragraph. Then a second stop means such as a bead or the like is secured to the line at some point between the lower eyelet and the weight secured to the free end of said line. Such a rigging allows the hook to move within a defined range along the line while at the same time allowing one to determine the extent to which the hook is separated from the bottom of the lake or the like.

Still another embodiment of the inventive hook is illustrated in FIG. 3. There the hook includes an elongated shank portion 1. A generally U-shaped portion 2 extends outwardly from a lower portion of the shank 1. An extended length of hollow tubing 21 is secured to an upper portion of the shank 1 in such a manner that the shank and the tubing 21 are spaced apart for most of the length of the tubing 21. The tubing 21 preferably has a slot 22 which extends the length of the tubing so as to allow one to insert a length of line into the hollow portion of the tubing without having to pass the line through the spaced apart eyelets 3 and 4 formed by the opposite ends of the tubing. Preferably the slot 22 extends around the circumference of the tubing 21. This serves to limit the likelihood that the hook might accidentally be pulled free of the line. A knot, bead, weight, or other suitable stop means 23 is attached to the line 10 above the upper eyelet 3 and a sinker 9 is attached to the lower free end of the line. The slot 22 in the tubing could even take the form of a helix. An extreme example of such a devise would be one in which the tubing 21 was replaced with a length of coiled spring, such as the springs found in retractable ball point pins.

The second type of inventive angling device comprises (1) a relatively inflexible rod having a length of at least about 1 foot and (2) a hook including an elongated shank portion, a generally U-shaped portion extending outwardly from a lower portion of said elongated shank portion, and an eyelet, wherein the eyelet of said hook is attached a lower end portion of said rod in close proximity thereto.

The relatively inflexible rod can be constructed of any suitable material, for example heavy guage wire, fiberglass, carbon fiber/synthetic polymer composite, or the like. Obviously, it is desirable for the rod to have strength properties sufficient to withstand the type of game likely to be encountered. Generally, it is desirable for the rod to be no more flexible than the wire generally used in making coat hangers. In fact the rod can be readily made from a straightened length of coat hanger. Preferably the rod is substantially linear and capable of supporting its own weight when held horizontally.

The eyelet of the hook can be connected to the rod any suitable manner. One technique would involve providing the rod with a hole which extends through a lower portion of the rod. The hook could then be attached to the rod by means of a ring or swivel or the like. In order to obtain an angling device that is most resistant to being hung up when used in brush, it is desirable for the hook to be attached as closely as possible to the rod. Accordingly, it is generally preferred that the distance between the hook eyelet and the rod be no more than about 1 centimeter. It is also most desirable for the hook to be attached to the rod at the lower end of the rod.

The length of the rod can vary over a wide range. Generally, for best results the rod would have a length in the range of about 1 foot to about 5 foot, still more preferably about 1 foot to about 3 foot. The upper end of the rod is preferably provided with means which allow the rod to be attached to a line.

This type of angling device is particularly useful when fishing in brushy areas. The length of relatively inflexible rod limits the degree of freedom of the hook and thus reduces the likelyhood that the hook will become hung on brush as it is being lower or raised. This is particularly important when the hook is being raised when a fish has caught since the rod limits the degrees of freedom of the fish. The rod also limits the ability of live bait to pull the hook into brush. As a general rule the rod has enough weight that it is not nessary to employ a sinker; however, such additional weight could be attached to the rod if desired.

An especially preferred embodiment of the invention concerns an angling rig comprising the combination of a hook having multiple eyelets and a rod of the type just described. An example of such a device is illustrated in FIG. 2. In FIG. 2 the hook includes an elongated shank portion 1, a generally U-shaped portion 2 extending outwardly from a lower portion of the shank portion 1. The hook further includes a first eyelet 3 extending outwardly from an upper portion of the shank 1 and a second eyelet 4 extending outwardly from a lower portion of the shank 1.

An elongated relatively inflexible generally linear rod 20 extends through the eyelet 3. The rod is preferably of a diameter that allows the hook to be free to rotate about the central axis of the rod 20. The upper end of the rod contains a hole and the line 10 is secured to the rod by being either passed through that hole and tied into a knot or by passing a ring or swivel or the like through that hole and then tying the line to the ring or swivel or the like. The lower end of the illustrated rod includes a flattened portion 19 having a width which will preclude the hook from being passing through eyelet 3. In the illustrated rod the flattened portion has a hole extending therethrough and a sinker 9 is secured to the rod by means of a line which has been passed through the hole in the flattened portion 21 and secured thereto. The sinker 9 is secured to the hole in the flattened portion 19 of the rod 20 by a length of line which is passed through eyelet 4.

While the use of the relatively inflexible rod has been illustrated with the multiple eyelet hook, it is within the scope of the present invention to use the rod with generally any type of hook. For example, a normal fish hook having only a single eyelet could be attached to the rod 20 by passing a ring or swivel through the eyelet of the hook and the opening in the lower flattened portion 21 of the rod.

While the present invention has now been described in general terms and has been illustrated by some specific embodiments, it should be clear that many variations and modifications can be made without departing from the spirit and scope of the present invention.

What is claimed is:

1. An angling device comprising (1) a hook comprising an elongated shank portion, a generally U-shaped portion extending outwardly from a lower portion of said shank portion, and first and second spaced apart eyelets connected to said hook and (2) a length of line extending through said first and second eyelets and (3) stop means secured to said line to limit the extent to which the hook can travel in at least one direction along the length of the line.

2. An angling device according to claim 1 wherein said first and second eyelets extend outwardly from generally the same side of said elongated shank portion.

3. An angling device according to claim 2 wherein said eyelets extend outwardly from said elongated shank portion in a direction generally opposite of the direction in which the generally U-shaped portion extends.

4. An angling device according to claim 3 wherein said generally U-shaped portion terminates in a pointed free end.

5. An angling device according to claim 1 wherein the center of the openings of said first and second eyelets are generally in alignment in a plane that passes through a substantial portion of the elongated shank portion.

6. An angling device according to claim 3 wherein said stop means comprises a stop means secured to said line between said first and second eyelets.

7. An angling device according to claim 6 wherein said stop means comprises a pair of weights through which said line passes and a knot or bead fixed to said line between said weights, said knot or bead being unable to pass through said weights and said weights being too large to pass through said eyelets and said weights being otherwise free to move along said line between the first and second eyelets.

8. An angling device according to claim 7 wherein a weight is also attached to said line at a point below the lowermost eyelet.

9. An angling device according to claim 3 wherein said stop means comprises a first device securely fixed to said line above the uppermost eyelet and a second device securely fixed to said line below the lowermost eyelet, each said device being too large to pass through the eyelet with which said device is most closely associated.

10. An angling device according to claim 3 wherein said stop comprises a slideable weight through which said line passes and a knot in the line above the slideable weight, said weight being located between said eyelets and being incapable of passing through the upper eyelet, said knot being able to pass through the upper eyelet but not through said slideable weight.

11. An angling device according to claim 1 wherein said stop means comprises a stop means secured to said line between said first and second eyelets.

12. An angling device comprising (1) a relatively inflexible rod having a length of at least about 1 foot and (2) a hook including an elongate shank portion, a generally U-shaped portion extending outwardly from a lower portion of said elongated portion, and an eyelet, wherein said eyelet of said hook is attached to a lower end portion of said rod in close proximity thereto wherein said rod passes through said eyelet and the lower end of said rod terminates in a stop means which will preclude the hook from slipping off the rod.

13. An angling device according to claim 12 wherein said hook comprises an elongated shank portion, a generally U-shaped portion extending outwardly from a lower portion of said shank portion, a first eyelet extending generally outwardly from a upper portion of said elongated shank portion, and a second eyelet extending generally outwardly from a lower portion of said shank portion, and said relatively inflexible rod extends through said upper eyelet and has on its lower end a stop means to prevent the hook from sliding off said relatively inflexible rod, and wherein a length of line passes through the lower eyelet with one end of said line being secured to the lower end of said rod and the other end of said line being secured to a weight.

14. An angling device according to claim 13 wherein said rod has a length in the range of about 1 foot to about 5 foot.

15. An angling device according to claim 13 wherein said rod has a length in the range of about 1 foot to about 3 foot.

16. An angling device comprising a hook comprising an elongated shank portion, a generally U-shaped portion extending outwardly from a lower portion of said shank portion, and first and second spaced apart eyelets connected to the hook, said first and second spaced apart eyelets extending outwardly from the main axis of said elongated shank portion, said first eyelet extending outwardly from the end of said upper shank portion and said second eyelet extending outwardly from a lower portion of said shank portion, wherein the first and second eyelets are generally parallel to each other and generally perpendicular to the main axis of the shank portion of the hook.

17. An angling device according to claim 16 wherein said shank portion has a generally linear portion and the two eyelets are spaced apart by a distance at least equal to the length of the generally linear portion of the shank.

* * * * *

UNITED STATES PATENT AND TRADEMARK OFFICE
CERTIFICATE OF CORRECTION

PATENT NO. : 5,083,394
DATED : Jan. 28, 1992
INVENTOR(S) : Jim L. Hartwig

It is certified that error appears in the above-identified patent and that said Letters Patent is hereby corrected as shown below:

On the cover page of the patent the Inventor's name should be --Jim L. Hartwig-- rather than "Jim L. Harwig'.

Signed and Sealed this

Thirteenth Day of April, 1993

*Attest:*

STEPHEN G. KUNIN

*Attesting Officer*   *Acting Commissioner of Patents and Trademarks*